J. F. PALMER.
PNEUMATIC TIRE.
APPLICATION FILED APR. 30, 1914.
1,293,528.
Patented Feb. 4, 1919.
3 SHEETS—SHEET 3.
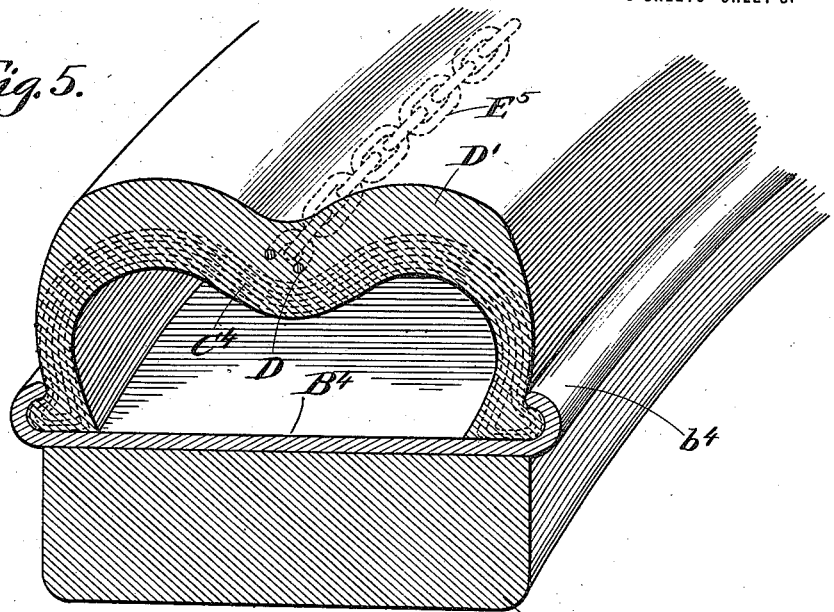
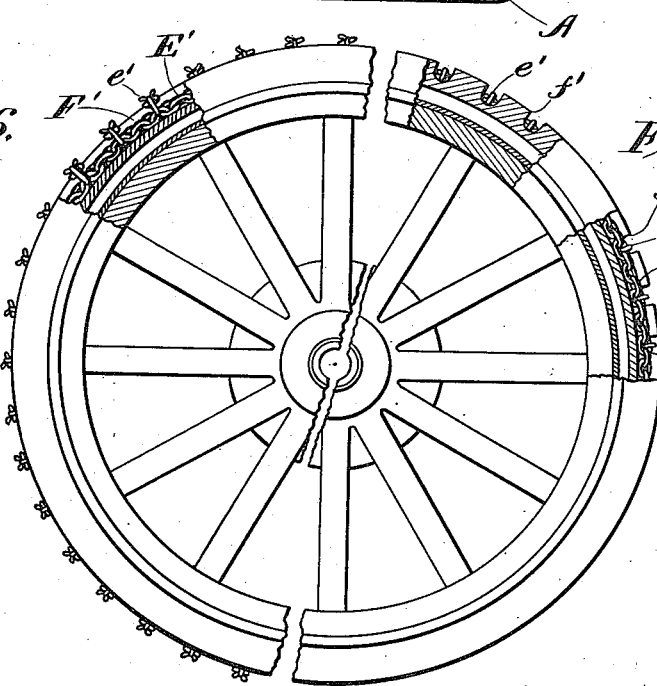
Witnesses:
C. Burnap
Henry A. Parke
Inventor:
John F. Palmer
By Sheridan, Wilkinson, & Scott Att'ys

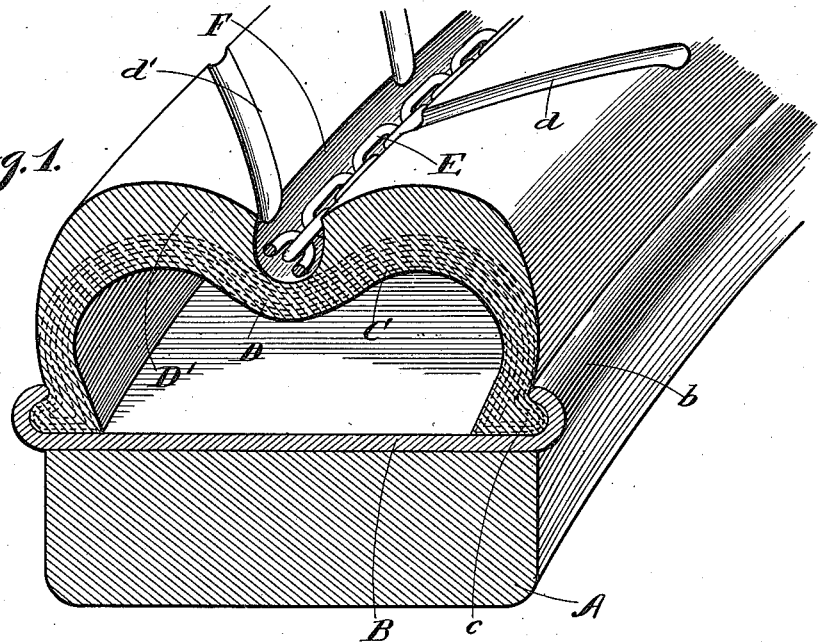
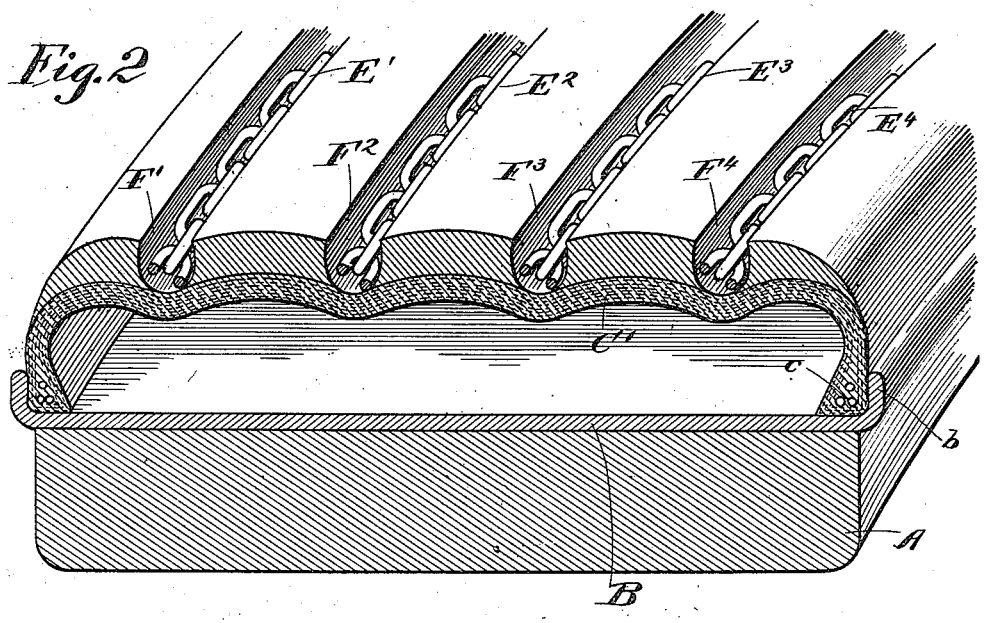

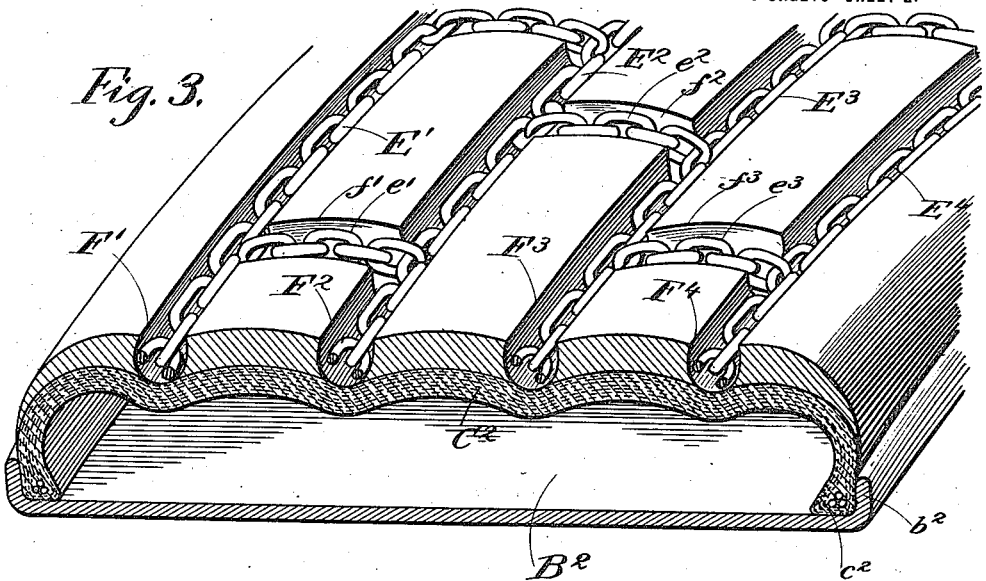
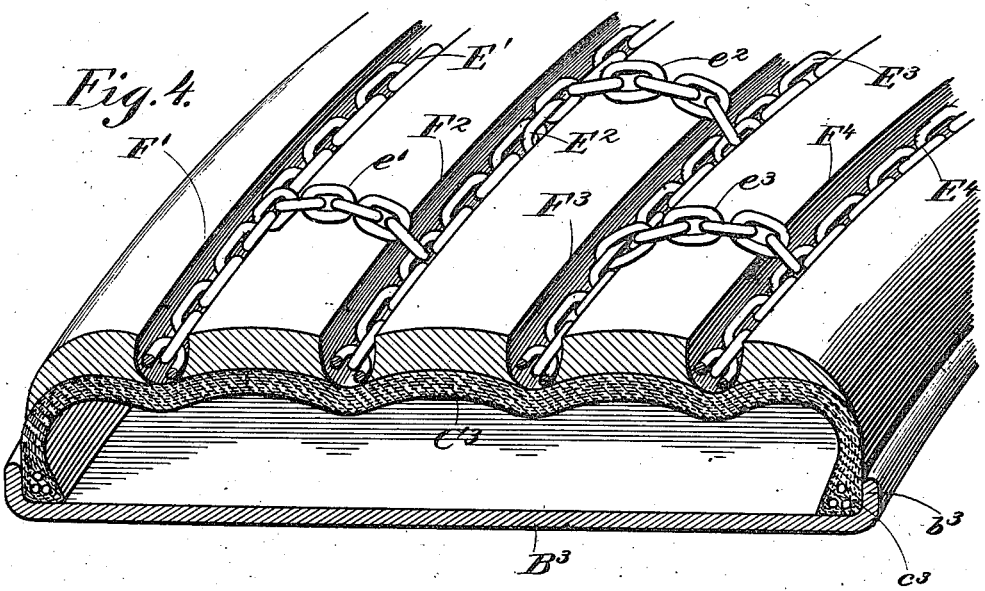

UNITED STATES PATENT OFFICE.

JOHN F. PALMER, OF RIVERSIDE, ILLINOIS.

PNEUMATIC TIRE.

1,293,528.                Specification of Letters Patent.          Patented Feb. 4, 1919.

Application filed April 30, 1914. Serial No. 835,489.

*To all whom it may concern:*

Be it known that I, JOHN F. PALMER, a citizen of the United States, residing at Riverside, in the county of Cook and State of Illinois, have invented certain new and useful Improvements in Pneumatic Tires, of which the following is a specification.

My invention relates in general to pneumatic tires, and more particularly to a pneumatic tire casing which will have a predetermined cross section of restricted radial extent.

It is well-known in the art of pneumatic tires that the pressure of the confined compressed air tends to impart to the tire a circular cross section, and also that the greater the weight to be supported the greater must be the volume of the supporting compressed air. It is further well-known that the closer the edge of the rim is to the surface over which the wheel travels the more economical of power will the tire be. It is therefore desirable that pneumatic tires should have a cross section of radial extent only sufficient to produce the requisite cushioning action in smoothing out road inequalities by receiving the inequalities in the tire.

Inasmuch as a sufficient volume of compressed air to support a heavy load would necessitate a large tire, the normal tendency of the compressed air to impart to such a tire a circular cross section necessarily results in the edge of the rim of the wheels being at such a distance from the surface traveled over as to render the transmission of power uneconomical. In order to overcome this difficulty it has been heretofore necessary to provide each wheel of a vehicle adapted to carry heavy loads with a plurality of pneumatic tires in order that sufficient volume of compressed air may be utilized to support the load and at the same time permit the location of the rims of the wheels sufficiently close to the surface traveled over to avoid the inefficient transmission of power which would be present if a single tire for each wheel were employed of sufficient size to contain the requisite volume of compressed air.

The primary object of my invention is to provide a pneumatic tire having a cross section under inflation which will present most advantageous width for weight carrying capacity and which will have only the minimum radial depth necessary to provide the requisite cushioning action, so that the wheel rim may be as close as practicable to the surface traveled over and the driving power thereby most efficiently transmitted.

A further object of my invention is to provide a pneumatic tire which when inflated will be maintained in the most efficient cross section for supporting a maximum weight and for most economically transmitting a power from the wheel rim to the surface traveled over.

A further object of my invention is to provide a pneumatic tire comprising a surrounding bond for preventing the compressed air confined in the tire from radially distending the tire beyond a predetermined degree.

A still further object of my invention is to provide an improved pneumatic tire which will be comparatively simple in construction, durable in use, and efficient in operation.

My invention will be more fully disclosed hereinafter with reference to the accompanying drawings, in which the same is illustrated as embodied in several convenient and practical forms, and in which—

Figure 1 is a cross sectional perspective view of one form of my improved tire mounted upon a rim.

Fig. 2 a view similar to Fig. 1 showing another form of my invention;

Fig. 3 a view similar to Fig. 2 illustrating still another specific embodiment of my invention;

Fig. 4 a view similar to Figs. 2 and 3 of a further specific form of my invention;

Fig. 5 a view similar to Fig. 1 disclosing still another form of my invention;

Fig. 6 an elevational view of a portion of a wheel having thereon the form of my invention shown in Fig. 4, parts being broken away to better disclose the construction of the tire; and Fig. 7 a view similar to Fig. 6 illustrating the form of my invention shown in Fig. 3 as applied to a wheel.

Similar reference characters are used to designate similar parts in the several figures of the drawings.

Referring more particularly to Fig. 1, reference letter A indicates the felly of a wheel having therein a rim B provided with peripheral side flanges b. C designates a pneumatic tire casing having beads $c$ along the inner peripheries of its sides adapted to be seated within the flanges $b$ of the rim B.

The tire casing C comprises a strain-resisting fabric D rurrounded by a tread D'. The tire is built on a form having a cross section to impart to the finished tire casing the desired depth and width. Any suitable strain-resisting fabric may be employed, and the tire casing may be built by any desired method, preferably, however, a strain-resisting fabric is used and a method of construction followed, such as disclosed in United States Patent No. 924,572, granted to me on June 8, 1909.

In order to limit the radial distention of the tire by the compressed air confined therein, so that the tire when inflated will have a less radial depth and greater width than would normally be imparted to the tire by the pressure of confined air, I surround the tire casing with an inexpansible bond E, which is preferably formed of an endless chain ring. The circumference of the ring is so related to the circumference of the tire casing that when the tire is inflated the longitudinal central portion thereof will be prevented from expanding beyond the extent determined by the circumference of the surrounding ring.

If desired, the surrounding ring E may be located within a channel F formed at the longitudinal center of the tread of the tire casing.

When the tire is to be used upon a wheel having a wide felly, as is necessary in the case of wheels of vehicles adapted to carry heavy loads, it is preferable that the tire should be provided with a plurality of longitudinal bonds surrounding the same, in order that a cross section may be imparted to the tire when inflated which will have a comparatively short radial depth and a comparatively great width. One embodiment of this form of my invention is illustrated in Fig. 2 in which C' designates the tire casing around which are located a plurality of inexpansible rings E', $E^2$, $E^3$ and $E^4$, which are preferably formed of chain. The rings may be, and preferably are, located in longitudinal channels F', $F^2$, $F^3$ and $F^4$ formed in the tread of the tire casing.

In the form of my invention in which a plurality of parallel inexpansible rings are provided for restricting the radial expansion of the tire, the adjacent rings may be united by connections $e'$, $e^2$ and $e^3$. This construction is shown in Fig. 3, in which $E^2$ designates the tire casing having the parallel longitudinal channels F', $F^2$, $F^3$ and $F^4$ formed therein to receive the surrounding inexpansible rings. The tread of the tire casing may also be provided with transverse channels connecting the adjacent longitudinal channels, within which lie the transverse connection $e$, $e^2$ and $e^3$, which unite the adjacent rings.

In Fig. 4 I have illustrated a slight modification of the form of my invention shown in Fig. 3, in which the transverse connecting members $e'$, $e^2$, and $e^3$, which unite the adjacent rings E', $E^2$, $E^3$ and $E^4$, are not seated within channels formed in the tread of the tire casing, but extend radially beyond the tread of the tire casing. In this form of my invention the connecting members by reason of their exposed positions around the tire casing serve to increase the traction and thereby prevent skidding.

In Fig. 5 I have illustrated a form of my invention similar to that shown in Fig. 1, but in which the bond is embedded in the tread D' of the tire $C^4$. The bond is shown as formed of a chain ring $E^5$ of such a circumference as to so limit the radial expansion of the tire casing as to impart to the tire when inflated a cross section of the desired radial depth and width.

From the foregoing description it will be obvious that I have invented an improved pneumatic tire, which when inflated will have a predetermined cross section so as to present the most advantageous width for weight carrying capacity with the minimum depth for giving the most efficient power transmission with sufficient receptiveness to fully provide the pneumatic function of leveling inequalities. It will be evident that in my improved pneumatic tire the tendency of the confined compressed air to impart to the tire a circular cross section is so restrained as to reduce the radial depth of the tire to such an extent as to give the most efficient power transmitting results without interfering with the essential pneumatic action of absorbing inequalities in the road. It will be further evident that in my improved pneumatic tire a volume of compressed air may be employed adequate to support maximum loads without decreasing the power transmission efficiency which would result from the spacing of the wheel rim a distance away from the surface traveled over incident to a large volume of compressed air unrestrictedly confined within the tire. It will be further seen that in my improved tire a wide contact is provided between the tread of the tire and the surface traveled over so as to provide an increased traction, which traction is further increased by the projection of the restricting chain rings radially beyond the tread of the tire.

I claim:

The combination with a relatively wide tire rim, of a pneumatic tire casing mounted upon and of substantially the same width as said rim, and a traction increasing bond surrounding said casing for restricting the radial distention of said casing and imparting thereto a radial depth less than the width of said casing, said bond comprising a plurality of chain rings seated in grooves extending longitudinally around the tread of the casing and transverse chains uniting adjacent rings and seated in grooves in the tread of the casing for retaining said rings in operative positions upon the casing.

In testimony whereof, I have subscribed my name.

JOHN F. PALMER.

Witnesses:
 GEO. L. WILKINSON,
 HENRY A. PARKS.